United States Patent
Davis et al.

(10) Patent No.: US 9,628,562 B2
(45) Date of Patent: Apr. 18, 2017

(54) DATA AND EVENT GAP RECONCILIATION ACROSS NETWORKS USING DIFFERENT COMMUNICATION TECHNOLOGIES

(71) Applicant: LANDIS+GYR INNOVATIONS, INC., Alpharetta, GA (US)

(72) Inventors: James S. Davis, Woodstock, GA (US); Eric Kramer, Pillager, MN (US); Siva Suthram, Chaska, MN (US); Bonny Hicks, Marietta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 109 days.

(21) Appl. No.: 14/632,409

(22) Filed: Feb. 26, 2015

(65) Prior Publication Data

US 2015/0244501 A1 Aug. 27, 2015

Related U.S. Application Data

(60) Provisional application No. 61/944,719, filed on Feb. 26, 2014.

(51) Int. Cl.
| | |
|---|---|
| *H04L 1/14* | (2006.01) |
| *H04L 29/08* | (2006.01) |
| *H04L 1/18* | (2006.01) |
| *H04L 29/06* | (2006.01) |
| *H04L 1/00* | (2006.01) |

(52) U.S. Cl.
CPC ........ *H04L 67/1095* (2013.01); *H04L 1/1848* (2013.01); *H04L 69/28* (2013.01); *H04L 1/1887* (2013.01); *H04L 2001/0093* (2013.01)

(58) Field of Classification Search
CPC ... H04L 67/1095; H04L 1/1848; H04L 69/28; H04L 2001/0093; H04L 1/1887
See application file for complete search history.

(56) References Cited

U.S. PATENT DOCUMENTS

| | | | |
|---|---|---|---|
| 6,807,578 B2 * | 10/2004 | Satran | H04L 1/1854 370/352 |
| 2009/0006920 A1 | 1/2009 | Munson et al. | |
| 2014/0286258 A1 * | 9/2014 | Chowdhury | H04L 1/1812 370/329 |

FOREIGN PATENT DOCUMENTS

| | | |
|---|---|---|
| EP | 0969622 | 1/2000 |
| WO | 2015130914 | 9/2015 |

OTHER PUBLICATIONS

International Application No. PCT/US2015/017709, International Search Report and Written Opinion mailed on Jun. 1, 2015, 11 pages.

* cited by examiner

*Primary Examiner* — Guy Lamarre
(74) *Attorney, Agent, or Firm* — Kilpatrick Townsend & Stockton LLP

(57) ABSTRACT

Systems and methods automatically detect missing data and attempt to collect the missing data. The missing data may be related to a data reading or may be related to an event. The missing data is detected by comparing a communication received from an endpoint with previously received communications from the endpoint. The communication technology used by the endpoint may be considered in determining how to detect missing data and how to request the missing data from the endpoint. A single headend system may communicate with endpoints that use different communication technologies by adjusting the speed, batch size and the retry process used.

13 Claims, 4 Drawing Sheets

DATA AND EVENT GAP RECONCILIATION ACROSS NETWORKS USING DIFFERENT COMMUNICATION TECHNOLOGIES

RELATED APPLICATION

This application claims priority to U.S. provisional application No. 61/944,719, filed Feb. 26, 2014 which is incorporated herein by reference.

FIELD OF THE INVENTION

This invention relates generally to determining that one or more communications have not been received and collecting missing data or information using a process that is based on the communication technology used by the endpoint where different endpoints may use different communications technologies.

BACKGROUND

In a network with multiple endpoints that collect data and report the collected data to a headend system, such as a Command Center, it is possible that certain data will be collected at the endpoint but that the headend system will not receive all of the collected data due to various reasons, including a hardware failure or a software failure affecting the endpoint, a network issue, or a power outage. When data is missing, the headend system needs a process to recognize that the data is missing and a process to obtain the missing data.

Since different endpoints may use different communication technologies including, but not limited to, radio frequency (RF), power line communication (PLC), and cellular, the processes needs to be adaptable to the communication technology used by each endpoint. If it is not, then a process designed for one technology may overload or otherwise impair a network using a different technology.

SUMMARY

A headend system automatically detects missing data, i.e., detects a gap, and attempts to collect the missing data, i.e., collects the gap. The headend system may operate across a network having a number of endpoints where different endpoints use different communication technologies. The different technologies may require that the headend system adjusts the manner in which it communicates with the endpoints to collect any gaps. The adjustments may relate to the speed, batch size and retry processes used.

The headend system may detect a variety of gaps, such as self read gaps, interval gaps, and event gaps. A gap is detected by comparing a communication received from an endpoint with previously received communications from the endpoint. Once a gap is detected, the headend system attempts to collect the missing data in a gap reconciliation process. During the gap reconciliation process, the headend system sends a request to the device from which the headend system expected to receive the missing data. If the data is not received during the initial gap collection process, then the headend system may invoke a gap retry process. The gap retry process repeats the attempt to collect the missing data or information.

BRIEF DESCRIPTION OF THE DRAWINGS

These and other features, aspects, and advantages of the present disclosure are better understood when the following Detailed Description is read with reference to the accompanying drawings, where.

DETAILED DESCRIPTION

Aspects of this invention recognize that data is missing and request the missing data from a network endpoint where different network endpoints may communicate with a headend system using different types of communication technologies. The headend system may automatically detect that data is missing and may attempt to collect the missing data. If the missing data is not collected, then the headend system may try again to collect the missing data. The manner in which the headend system may attempt to collect the missing data may differ based on the different types of communication technologies. Types of communication technologies supported by the headend system include radio frequency (RF), power-line communication (PLC), and cellular.

Gap Detection, Gap Reconciliation, and Gap Retry

The headend system includes processes that perform 1) gap detection, 2) gap reconciliation or gap collection, and 3) gap retry. Gap detection is the detection of missing data or information. The data is considered missing because the headend system expects to receive data on a certain schedule, but no data has been received or because the data received by the headend system indicates that there is additional data that has not been received.

Once a gap is detected, the headend system attempts to collect the missing data in a gap reconciliation process, which is also referred to herein as a gap collection process. In some implementations there are two types of gap collection processes: 1) a steady state process and 2) a non-steady state process. The steady state process is used under normal operating conditions and the non-steady state process is used under abnormal conditions, such as a mass outage. In the case of a mass outage, the headend system may alter the gap collection process to avoid flooding the network or sending requests to endpoints that remain offline. During gap collection, the headend system sends a request to the device from which the headend system expected to receive the missing data or information. If the data is not received during the initial gap collection process, then the headend system may invoke a gap retry process. The gap retry process repeats the attempt to collect the missing data or information.

Exemplary Operating Environment

Figure 1:
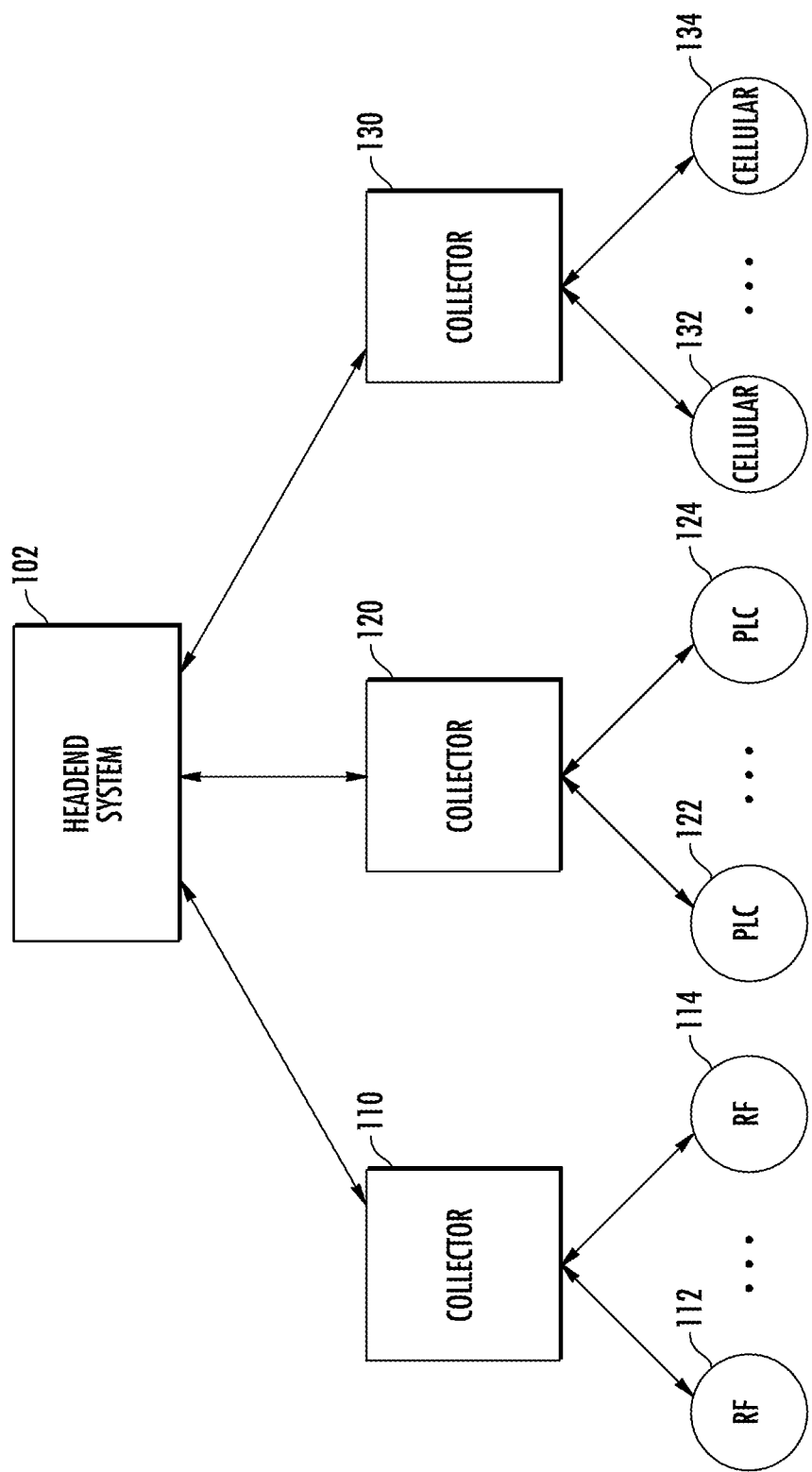
FIG. 1 is a block diagram illustrating a portion of an exemplary network.

FIG. 1 illustrates a portion of an exemplary operating environment that includes a headend system 102, collectors 110, 120, 130, and endpoints 112, 114, 122, 124, 132, 134. As indicated, the endpoints on the network may use different communication technologies, such as RF, PLC, and cellular. The collector 110 and endpoints 112, 114 communicate using RF, the collector 120 and endpoint 122, 124 communicate using PLC, and the collector 130 and the endpoints 132, 134 communicate using cellular. Other types of communication technologies may also be used. The headend system may communicate with a collector using a different communication technology than the communication technology used by the collector and its endpoints. Alternatively, the headend system may communicate with a collector using the same communication technology used by the collector and its endpoints.

The endpoints may communicate with other endpoints or devices that use the same communication technology. For example, endpoint 112 may communicate with endpoint 114, as well as other endpoints or devices (not shown). The relationships between the endpoints or between an endpoint and a collector may change over time.

In one implementation, the endpoints of the network are devices that include meters for measuring consumption of a resource, such as electricity, gas, or water. Each device may be associated with a premises, such as a home, building, or unit within a building. The devices may store measurement data and communicate it to the headend. The devices may communicate with each other and with other network devices, including routers and collectors. Although FIG. 1 shows a network where the headend system communicates with a collector that in turn communicates with a number of endpoints, the invention is not limited to the illustrated topology and other network configurations are possible.

The headend system may include a user interface that allows a user to configure certain parameters used for communications between the headend system and the endpoints. The values of some of the parameters may be based on the communication technology used by the endpoint. For example, the value used to communicate with an endpoint with an RF interface may be different than the value used to communicate with an endpoint with a cellular interface. The system may also include a display and a user input device to display information about the network, the endpoints, the collected data, etc.

The network devices, such as the endpoints, the collectors and the headend system, may include or otherwise access a microcontroller or other processor to enable the device to carry out computer and command functions. The network devices may also include a storage medium, such as a memory, a floppy disk, CD-ROM, DVD, or other storage device located internal to the node or accessible by the node via a network, for example. Computer-readable instructions may be stored in the storage medium and may be executed by the processor to perform the operations described herein. The network devices may also include one or more hardware components for physically interfacing with the network, such as, but not limited to, a network interface controller or a transceiver. In one implementation, the endpoints are utility meters that include a communication module for communicating on the network and a metrology module for measuring data related to resource consumption.

Gap Detection

A gap is detected by the headend system in response to receiving a communication and comparing it to one or more previously received communications. The headend system does not detect a gap until it receives a communication that occurs after the gap. In other words, the headend system does not detect a gap based on a lack of communication, but instead uses a comparison of received communications. The types of gaps that may be detected by the headend system include: 1) self read gaps, 2) interval gaps, and 3) event gaps. Self read gaps are directed to data that is associated with a particular time, e.g., data associated with a state of a meter which is taken at midnight each night. Interval gaps are directed to data that is associated with a particular interval, e.g., data associated with a 15 minute interval. Event gaps are directed to data that is associated with a particular event. In some implementations, the events may include data-related events, such as self read data and interval data.

The headend system may provide configurable options or parameters for gap detection. For example, the headend system may contain an option for setting a date and/or time range to look for gaps. If this option is used, then the headend system may only look for gaps within the specified date and/or time range or may only attempt to collect missing data for gaps within the specified date and/or time range. The headend system may also provide an option for enabling/disabling gap detection for the different types of gaps. For example, there may be a setting to enable/disable self read gaps and a setting to enable/disable interval read gaps. There may also be a setting for specifying a minimum number of communications from an endpoint before detecting a gap. In one implementation, two communications are required before a gap is detected.

The headend system may detect gaps as communications are received from the endpoint. Alternatively, the headend system may receive communications from an endpoint and log information about the communications and then later use the logged information to detect a gap. In this situation, the headend system may allow a user to specify when the gap detection process will run, e.g., once a day.

Information about the gaps may be available to the user via the user interface of the headend system. The information may identify the gaps that have been detected and may provide information about any attempts to collect the missing data. The user interface may also display data received from the endpoints, including an indication of any data that was received via the gap reconciliation process.

Self Read Gap

Figure 2:
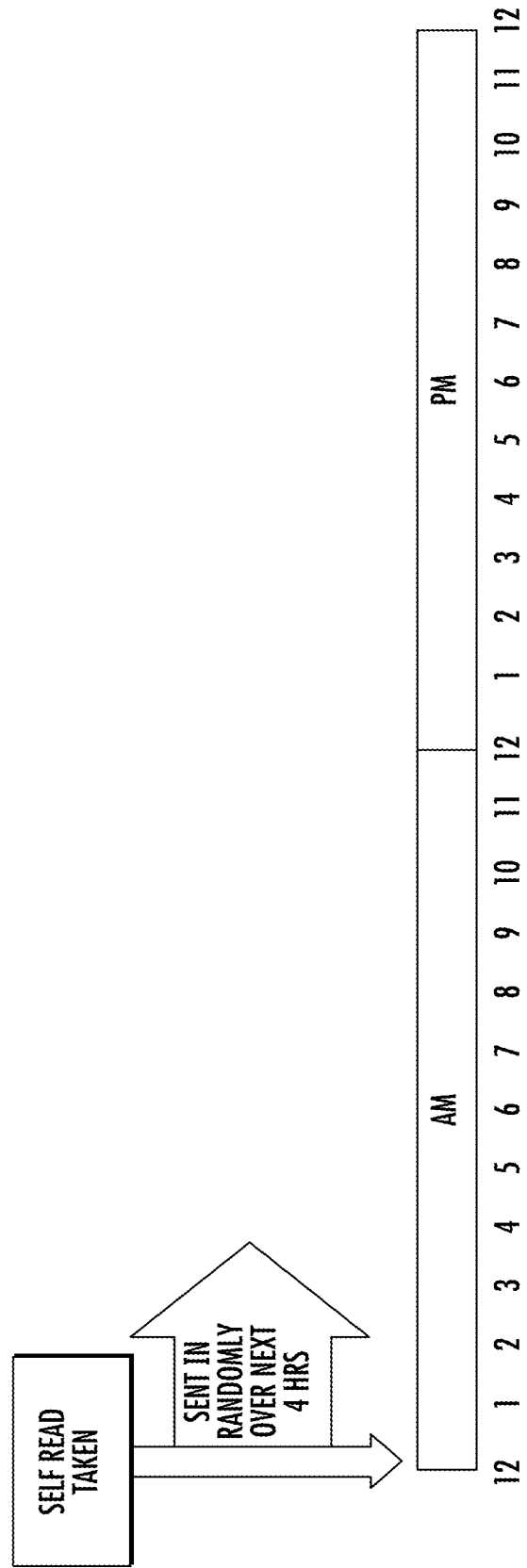
FIG. 2 is a diagram illustrating an exemplary self read data reading.

In one implementation where the endpoints are utility meters, self read data provides a snapshot of resource consumption that corresponds to a specific time. In one example, the data corresponds to values taken at midnight. The data is sent from the endpoints to the headend system daily, typically randomized between midnight and 4 a.m., as shown in FIG. 2. In this example, a self read gap is detected once the headend system receives a communication that indicates that self read data for a particular day has not been received.

In one example, if the headend system receives: 1) self read data for January $12^{th}$ and 2) self read data for January $14^{th}$, then the headend system determines that a self read gap has occurred. The headend system determines that there has been a gap because it recognizes that the self read data for January $13^{th}$ should have been received prior to the self read data for January $14^{th}$.

In another example, if the headend system receives: 1) self read data for January 12th, 2) all interval data for January 12th, and 3) interval data for the interval from 8 a.m. to 12 p.m. on January 13th, then the headend system determines that a self read gap has occurred. The headend system determines that there has been a gap because it recognizes that the self read data from January $13^{th}$ should have been received prior to the interval data for the interval from 8 a.m. to 12 p.m. on January $13^{th}$. This example illustrates that a gap may be detected using communications related to other types of gaps.

Interval Gap

Figure 3:
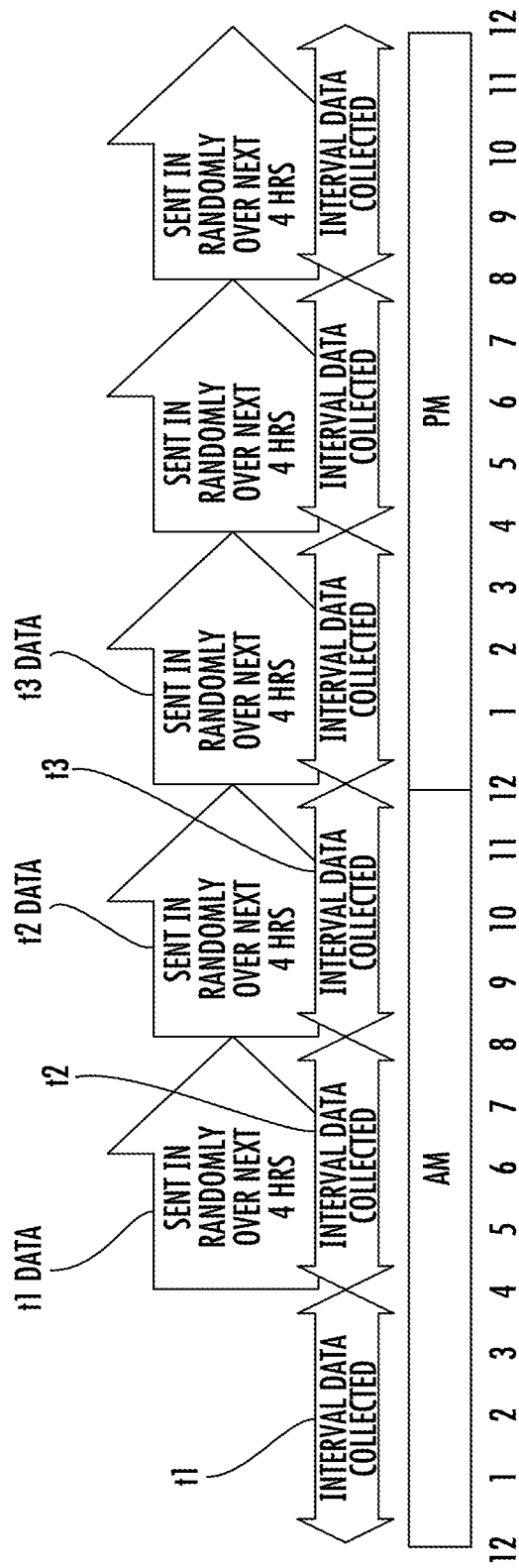
FIG. 3 is a diagram illustrating exemplary interval data readings.

In one implementation where the endpoints are utility meters, interval data indicates resource consumption over a fixed period of time. In one example, the data corresponds to consumption over 15 minute intervals. The data is sent from the endpoints to the headend system, typically randomized, over the four hours following the last interval in a four hour block, as shown in FIG. 3. FIG. 3 shows an example where interval data collected every 15 minutes during a four hour block, t1, is sent to the headend system by the endpoint sometime during the next four hour block, t2. The data for block t1 may be sent randomly during block t2. During block t3 the endpoint sends the interval data collected during block t2. A gap may be detected if the headend system receives data for some, but not all intervals within block t1. A gap may also be detected if the headend system receives data for the intervals within blocks t1 and t3, but does not receive any data for intervals within block t2. The headend system determines that an interval gap has occurred because it recognizes that it has not received interval data as expected. In this case, data has been received for an interval, but data is missing for one or more of the prior 15 minute intervals. The length of the intervals and the blocks, as well as the timing of the transmission of the event data, are not limited to the specific values used in this example.

Event Gap

In one implementation, an endpoint associates a sequence number with each communication sent from the endpoint related to an event. The event may be any type of event, including a metrology event, a communication module event, a self read data reading, and an interval data reading. The headend system keeps track of the received sequence numbers and recognizes when the sequence numbers indicate that there has been a gap. In one example, the endpoint increments the sequence number by one for each subsequent communication. In this example, an event gap is detected once the headend system receives a communication that indicates that data for a particular sequence number has not been received. For example, if the headend system receives: 1) event data with a sequence number of 10 and 2) event data with a sequence number of 12, then the headend system determines that an event gap has occurred. The headend system determines that there has been a gap because it recognizes that event data with a sequence number of 11 should have been received prior to the event data with a sequence number of 12. The sequence numbering scheme, including the way that the sequence number is adjusted by the endpoint for subsequent communications, is not limited to this example.

Gap Reconciliation

Once a gap has been detected, then the headend system records information about the gap and attempts to collect the missing data or information via a gap reconciliation process. The endpoints generally maintain data for some period of time so that the headend system can request data for prior times, intervals, or events. In one example, the endpoints maintain self read data for 4 days and interval data for 35 days.

The headend system sends one or more communications to the endpoint to request the missing data. These communications are also referred to herein as commands. The manner in which the requests are sent to the endpoint depends upon the communication technology used by the endpoint. The headend system may provide parameters to adjust the speed, batch size, and retry process to accommodate the communication technology used. The adjustments may be made by using different values for the parameters for different communication technologies. The values for the parameters may be provided by a user via the user interface provided by the headend system.

In one implementation the values of the following parameters are set based on the communication technology used by the endpoint: 1) Maximum Commands per Run by Collector; 2) Command Response Time Delay Minutes; and 3) Maximum Number of Retries. The value of the Maximum Commands per Run by Collector parameter specifies the number of self read and interval data gap commands that the headend may send per gap reconciliation process per collector. The value of the Command Response Time Delay Minutes parameter specifies the number of minutes the gap retry process will wait for a response from the endpoint before trying again. The value of the Maximum Number of Retries parameter specifies the maximum number of retries allowed per gap request. The Maximum Commands per Run by Collector parameter is used in the gap reconciliation process and the Command Response Time Delay Minutes and the Maximum Number of Retries parameters are used in the gap retry process. Alternative or additional parameters may be used in other implementations.

In one implementation, typical values for Maximum Commands per Run by Collector range from 1,000 to 10,000, typical values for Command Response Time Delay Minutes range from 5-60, and typical values for Maximum Number of Retries range from 1-5. In one example, the Maximum Number of Retries for a cellular network is 3, whereas the Maximum Number of Retries for an RF network and a PLC network is 5. The value selected may be based on the communication technology used, as well as other network specific factors.

The headend system may provide additional configurable options and parameters for gap collection. These options may apply across all communication technologies or there may be separate options for each if needed to accommodate specific communication technologies. For example, there may be a blackout time during which the gap collection process will not request missing data. In one implementation the blackout time is specified by setting a blackout begin time and a blackout end time. The blackout time may be set to correspond to a time of expected heavy network usage. During the blackout time, gap commands may be queued so that requests for missing data are sent after the blackout time. There may also be an option to disable the gap reconciliation process. This may be used in the case of a mass outage so that the headend system is not trying to communicate with endpoints that are unable to respond.

Other parameters may be used to control the number of requests sent by the headend system within a single run of the gap reconciliation process so that the network is not flooded with requests. These parameters may include: Maximum Interval Gap Requests per Collector, Maximum Self Read Gap Requests per Collector, and Interval Read Large Gap Threshold Minutes, which specifies the number of minutes above which the interval gap is too large for one run of the gap reconciliation process.

GAP Retry

If the headend system does not collect the missing data during the initial gap reconciliation process, then the request may be placed in a queue and retried later. When the request is placed in the queue the retry count associated with the request may be increased. Commands with higher retry counts may be given a higher priority than those with a lower retry count.

The headend system will also wait for the amount of time specified by the value of the Command Response Time Delay Minutes parameter before trying to send the command again. The headend system will continue to try sending the request until the retry count for the request exceeds the value of the Maximum Retries parameter. Once the value of the Maximum Retries parameter is exceeded, then the headend system stops trying to obtain the missing information. The headend system may log the gap request or otherwise record or indicate that the gap remains uncollected.

Exemplary Method for Gap Detection and Collection

Figure 4:
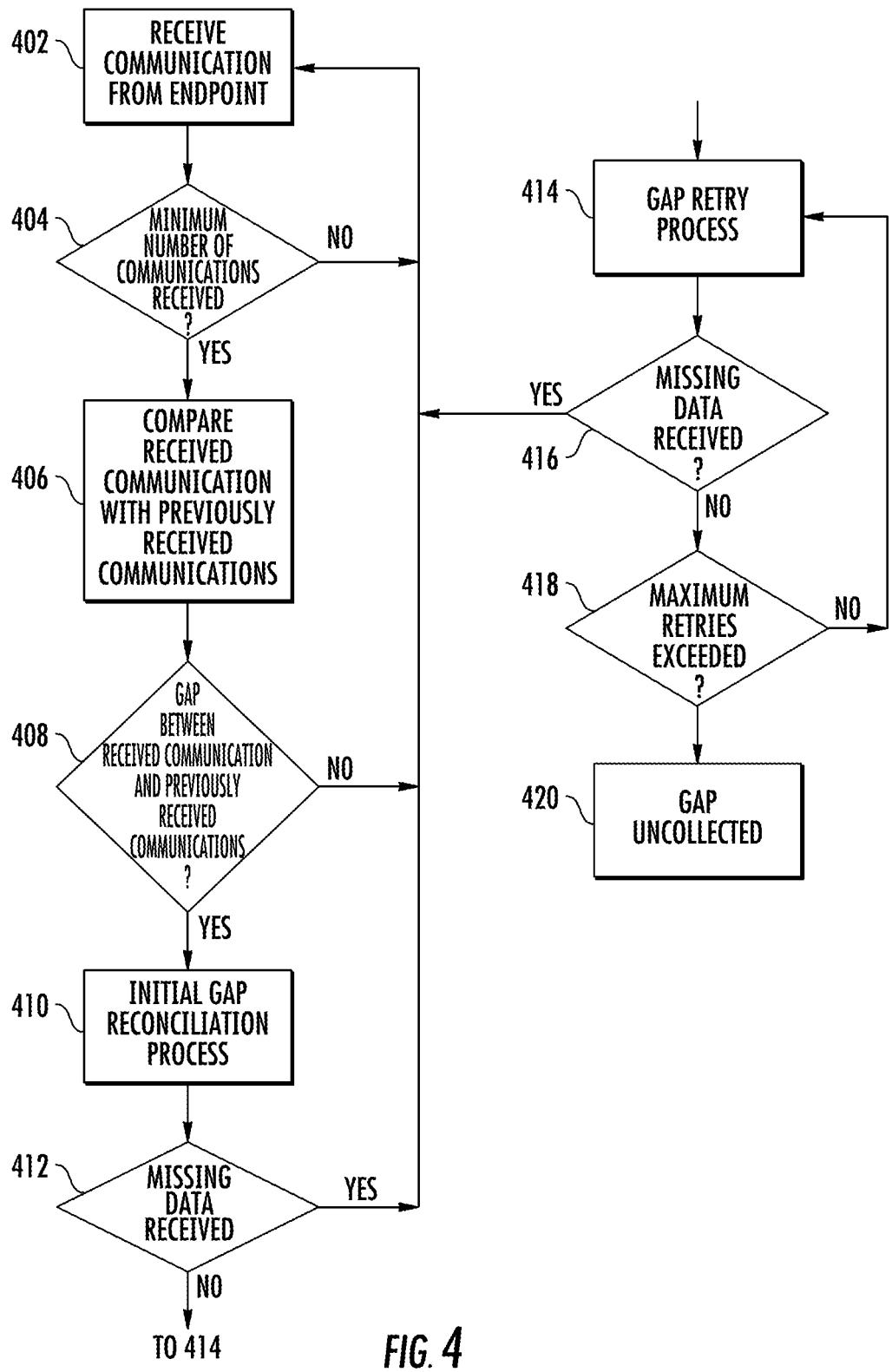
FIG. 4 is a flowchart illustrating an exemplary method for detecting a gap and then collecting the missing data.

FIG. 4 illustrates an exemplary method for gap detection and gap collection. The headend system receives a communication from an endpoint at 402. Block 404 is optional and if not used, then the method proceeds from 402 to 406. If used, then the headend system determines whether a minimum number of communications have been received from the endpoint before the headend system detects a gap. If the headend system determines at 404 that the minimum number has not been received, then the No branch is followed back to 402 and the headend waits for another communication from the endpoint. If the headend system determines at 404 that the minimum number has been received, then the method proceed to 406.

At 406, the headend system compares the communication received at 402 with previously received communications from the endpoint. The comparison may be similar to those described above in connection with self read gaps, interval gaps, and event gaps. From 406 the method proceeds to 408 and the headend system determines whether there is a gap between the communication received at 402 and the previously received communications from the endpoint. If there is no gap, then the method follows the No branch and returns to 402 to await another communication from the endpoint. If there is a gap, then the method follows the Yes branch to 410 where the initial gap reconciliation process is run. FIG. 4 illustrates that a gap is detected based on communications received before the gap and at least one communication received after the gap.

Once the gap reconciliation process is run, the method proceeds to 412 and the headend system determines whether the missing data has been received. If the missing data has been received, then the method follows the Yes branch back to 402 to await another communication from the endpoint. If the missing data has not been received, then the gap remains and the method follows the No branch to 414. At 414, the headend system runs the gap retry process. At this point, the headend system may increment or otherwise adjust the retry count associated with the request to collect the missing data. Once the gap retry process runs, the headend system determines whether the missing data has been received or the gap remains at 416. If the missing data has been received, then the method follows the Yes branch back to 402 to await another communication from the endpoint. If the missing data has not been received, then the gap remains and the method follows the No branch to 418. At 418, the headend system determines whether the retry count exceeds the value of the Maximum Retries parameter. If so, then the Yes branch is followed to 420 and the gap remains uncollected. If the retry count does not exceed the maximum, then the method follows the No branch and returns to 414.

If a gap is detected using logged data, then the method illustrated by FIG. 4 will be modified accordingly. The method will still detect a gap based on one or more communications received before the gap and at least one communication received after the gap.

As discussed above, the execution of one or more aspects of a method for detecting a gap and collecting the missing data may be subject to additional requirements, based on the settings or options selected. The values of some parameters used in the initial gap reconciliation process 410 and the gap retry process 414 may be based on the communications technology used by the endpoint.

The foregoing is provided for purposes of illustrating, describing, and explaining aspects of the invention and is not intended to be exhaustive or to limit the invention to the precise forms disclosed. Further modifications and adaptation of these embodiments will be apparent to those skilled in the art and may be made without departing from the scope and spirit of the invention. Different arrangements of the components described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. The invention is applicable to other types of networks and the collection of other types of data and information. The endpoints may use identifiers other than a sequence number to identify a sequence of communications. Additional and/or alternative commands and settings may be included to support additional communication technologies or to accommodate specific network characteristics or implementations.

What is claimed is:

1. A computer-implemented method for collecting data from an endpoint in a network, wherein the endpoint communicates across the network using a first communication technology and a second endpoint communicates across the network using a second communication technology, comprising:

receiving a first data communication from the endpoint;

receiving a second data communication from the endpoint;

comparing measurement data communicated in the first data communication and measurement data communicated in the second data communication and based on the comparison, determining whether there is a gap between the measurement data communicated in the first data communication and the measurement data communicated in the second data communication;

when there is a gap, then generating a request to collect measurement data associated with at least a portion of the gap;

transmitting the request to the endpoint, wherein the transmission of the request is controlled by a first value of a first parameter and the first value is based on the first communication technology;

based on an expiration of a response period, determining that the gap remains, wherein the response period is based on a second value of a second parameter and the second value is based on the first communication technology;

generating a retry request to collect the data associated with at least a portion of the gap; and transmitting the retry request to the endpoint.

2. The method of claim 1, wherein a headend system communicates with the endpoint via a network device that communicates with a plurality of endpoints using the first communication technology and communicates with a second network device that communicates with a second plurality of endpoints including the second endpoint, wherein the first value specifies a number of requests that may be sent to the network device during a predefined period.

3. The method of claim 1, wherein a headend system communicates with the endpoint via a network device that communicates with a plurality of endpoint using the first communication technology, wherein the second value specifies an amount of time to wait for a response to the request.

4. The method of claim 1, wherein the transmission of the retry request is also controlled by a third value of a third parameter, wherein the third value specifies a maximum number of retries and is based on the first communication technology.

5. The method of claim 1, wherein comparing measurement data communicated in the first data communication and measurement data communicated in the second data communication comprises comparing a sequence number associated with the measurement data communicated in the first data communication and a sequence number associated with the measurement data communicated in the second data communication.

6. The method of claim 1, wherein comparing measurement data communicated in the first data communication and measurement data communicated in the second data communication comprises comparing a time interval associated with the measurement data communicated in the first data communication and a time interval associated with the measurement data communicated in the second data communication.

7. The method of claim 1, wherein comparing measurement data communicated in the first data communication and measurement data communicated in the second data communication comprises comparing a date associated with the measurement data communicated in the first data communication and a date associated with the measurement data communicated in the second data communication.

8. The method of claim 1, further comprising:
receiving a third data communication from the second endpoint;
receiving a fourth data communication from the second endpoint;
comparing the third data communication and the fourth data communication and based on the comparison, determining whether there is a second gap between data communicated in the third data communication and data communicated in the fourth data communication;
when there is a second gap, then generating a second request to collect data associated with at least a portion of the second gap;
transmitting the second request to the second endpoint, wherein the transmission of the second request is controlled by a fourth value of the first parameter and the fourth value is based on the second communication technology;
based on an expiration of a second response period, determining that the second gap remains, wherein the second response period is based on a fifth value of the second parameter and the fifth value is based on the second communication technology;
generating a second retry request to collect the data associated with at least a portion of the second gap; and
transmitting the second retry request to the second endpoint.

9. The method of claim 1, wherein the first communication technology is one of radio frequency (RF), power line communication (PLC), or cellular, and the second communication technology is a different one of RF, PLC, or cellular.

10. A system for collecting data from an endpoint in a network, wherein the endpoint communicates across the network using a first communication technology and a second endpoint communicates across the network using a second communication technology, comprising:
a headend system with a user interface that receives a first value for a first parameter related to a response period and a second value for a second parameter related to a number of retries, wherein the first and second values are based on the first communication technology;
a network device that communicates with the headend system and that communicates with the endpoint using the first communication technology;
wherein the headend system is operable to:
determine that there is a gap in resource consumption data communicated by the endpoint by:
receiving a first data communication from the endpoint;
receiving a second data communication from the endpoint; and
comparing resource consumption data communicated in the first data communication and resource consumption data communicated in the second data communication and based on the comparison, identifying the gap between the resource consumption data communicated in the first data communication and the resource consumption data communicated in the second data communication;
generate a request to collect resource consumption data associated with at least a portion of the gap;
transmit the request to the endpoint via the network device;
when the resource consumption data associated with at least a portion of the gap is not received before an expiration of a response period, then determine that the gap remains, wherein the response period is specified by the first value of the first parameter;
generating a retry request to collect the resource consumption data associated with at least a portion of the gap; and
when the retry request is within an allowed number of retries, then transmit the retry request to the endpoint, wherein the allowed number of retries is specified by the second value of the second parameter.

11. The system of claim 10, wherein the first communication technology is one of radio frequency (RF), power line communication (PLC), or cellular, and the second communication technology is a different one of RF, PLC, or cellular.

12. The system of claim 10, wherein the user interface of the headend system receives a third value for a third parameter related to communication with the network device, and the third value specifies a number of requests that may be sent to the network device during a predefined period.

13. The system of claim 10, further comprising:
a second network device that communicates with the headend system and that communicates with the second endpoint using the second communication technology, wherein the user interface of the headend system receives a fourth value for the first parameter and a fifth value for the second parameter for communicating with the second endpoint.

* * * * *